United States Patent [19]

Wanvik et al.

[11] Patent Number: 5,566,621
[45] Date of Patent: Oct. 22, 1996

[54] CONVEYOR ARRANGEMENT FOR ROLLING TRANSPORT DEVICES

[76] Inventors: Jarle Wanvik, Skule Bárdsons qt. 5; Stein Lovoll, Strindveien 45, both of N-7016 Trondheim, Norway

[21] Appl. No.: 362,585

[22] PCT Filed: Jul. 9, 1993

[86] PCT No.: PCT/NO93/00112

§ 371 Date: Jan. 6, 1995

§ 102(e) Date: Jan. 6, 1995

[87] PCT Pub. No.: WO94/01313

PCT Pub. Date: Jan. 20, 1994

[30] Foreign Application Priority Data

Jul. 10, 1992 [NO] Norway .................................... 921781

[51] Int. Cl.$^6$ ............................................. B61B 11/00
[52] U.S. Cl. ........................ 104/173.1; 104/53; 104/139; 104/162
[58] Field of Search ................................. 104/162, 165, 104/172.3, 53, 139, 140, 145, 146, 172.1, 172.2, 173.1, 173.2, 176, 178

[56] References Cited

U.S. PATENT DOCUMENTS

| | | | |
|---|---|---|---|
| 1,397,939 | 11/1921 | Unger | 104/60 |
| 2,132,455 | 10/1938 | Bishop | 104/172.1 |
| 2,948,235 | 8/1960 | Stamler et al. | 104/162 |
| 3,531,119 | 9/1970 | Bonanno | 104/60 |
| 3,942,452 | 3/1976 | Peck | 104/173.2 |
| 4,548,136 | 10/1985 | Yamada | 104/172.3 |
| 4,681,039 | 7/1987 | Perrin | 104/173.2 |
| 4,928,601 | 5/1990 | Harder et al. | 104/53 |
| 5,140,910 | 8/1992 | Welter | 104/162 |
| 5,199,358 | 4/1993 | Barratt | 104/139 |

FOREIGN PATENT DOCUMENTS

| | | | |
|---|---|---|---|
| 0775898 | 1/1968 | Canada | 104/162 |
| 2668836 | 4/1992 | France | 104/173.2 |
| 338544 | 6/1921 | Germany | 104/173.1 |
| 1661093 | 7/1991 | U.S.S.R. | 104/162 |
| 1698154 | 12/1991 | U.S.S.R. | 104/162 |

*Primary Examiner*—Mark T. Le
*Attorney, Agent, or Firm*—Pittenger & Smith, P.C.

[57] ABSTRACT

An inclined elevator compreses a traveling chain, rope or cable with one or more push devices fixed to it at intervals.

The elevator is intended for bicyclists or similar manned vehicles and is designed for installation in inclined streets, pedes-trian tracks or in separate tracks specially designed for the purpose.

The elevator chain, cable or rope is running in a conduit with a slot for extension of the push device. The conduit is permanently installed on the ground. The push device is either running hidden inside the conduit on the ground, or, when in use, running on top of the conduit.

During operation the bicyclist is sitting on the bicycle, and the bicycle is rolled, pushed and guided on its own wheels.

The push device of the elevator can easily be adapted to wheelchairs, wheel wagons or similar vehicle.

8 Claims, 5 Drawing Sheets

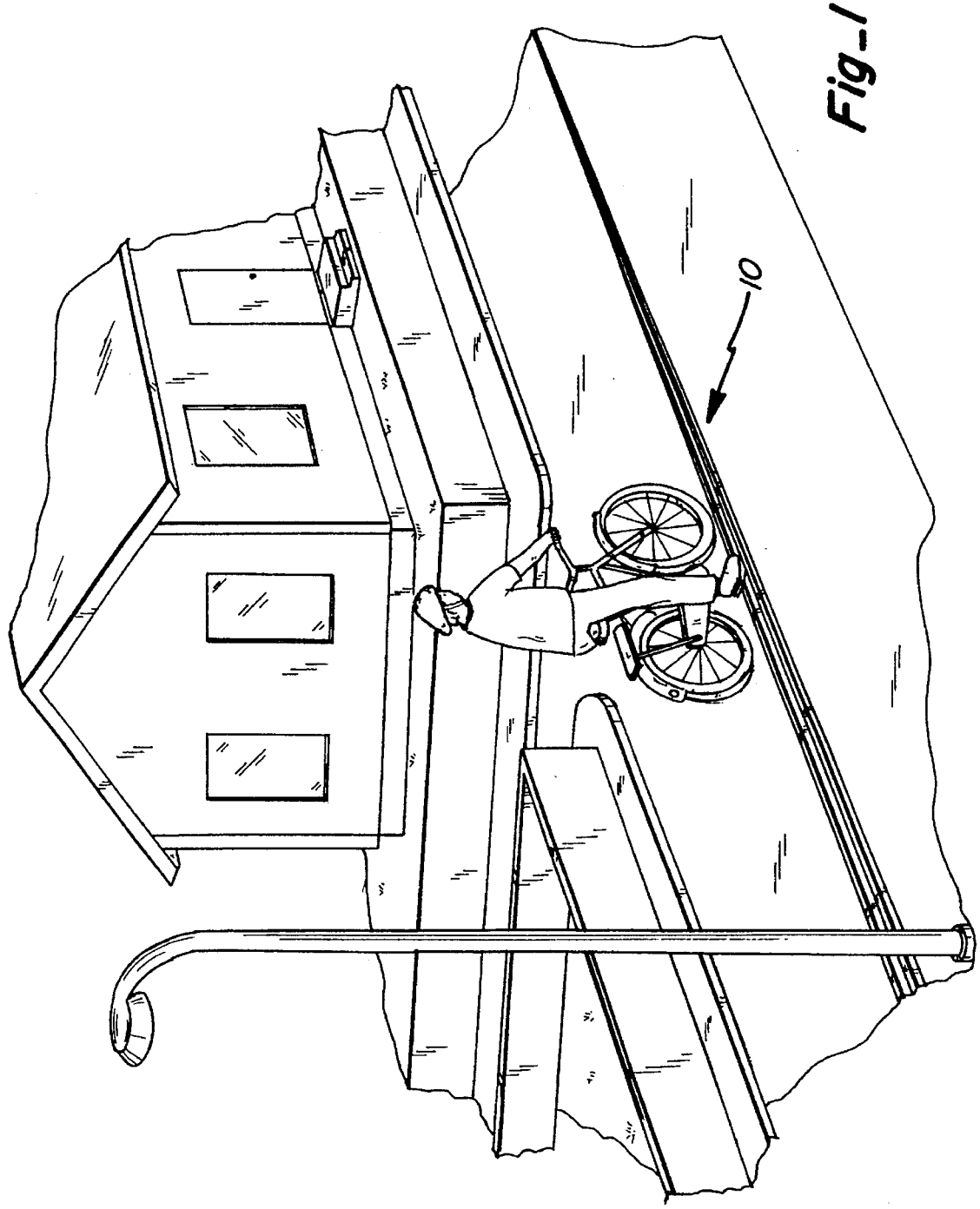
Fig_1

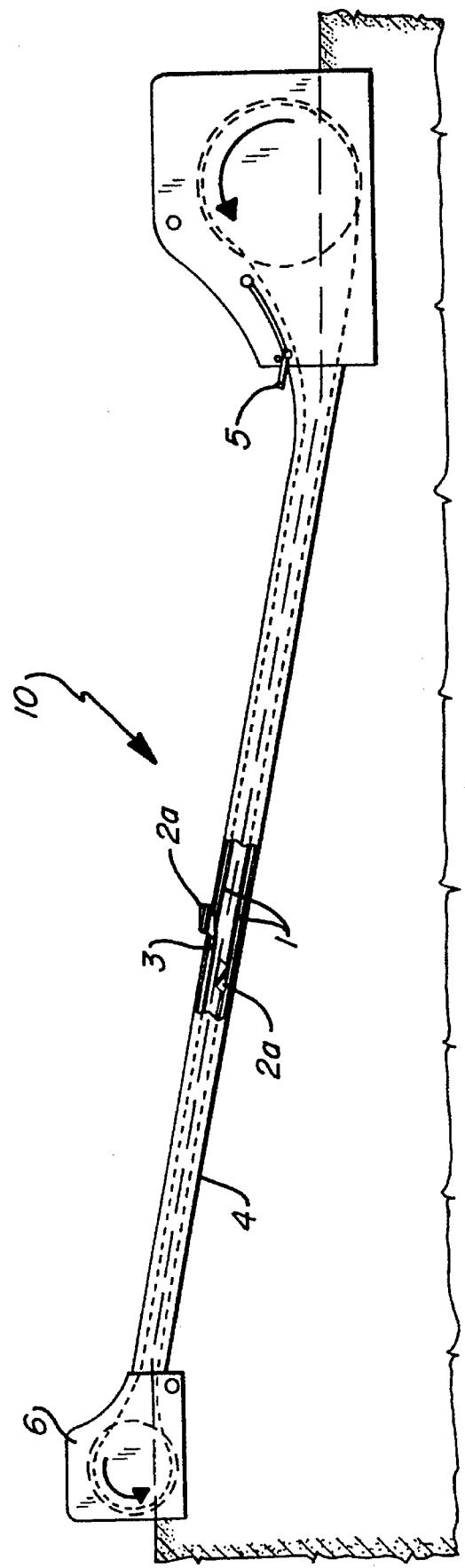
Fig_2A

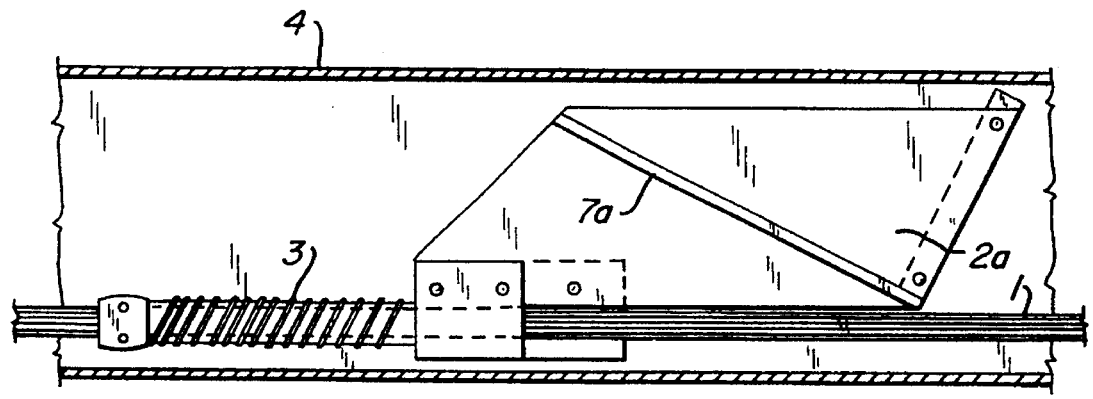
Fig_2B
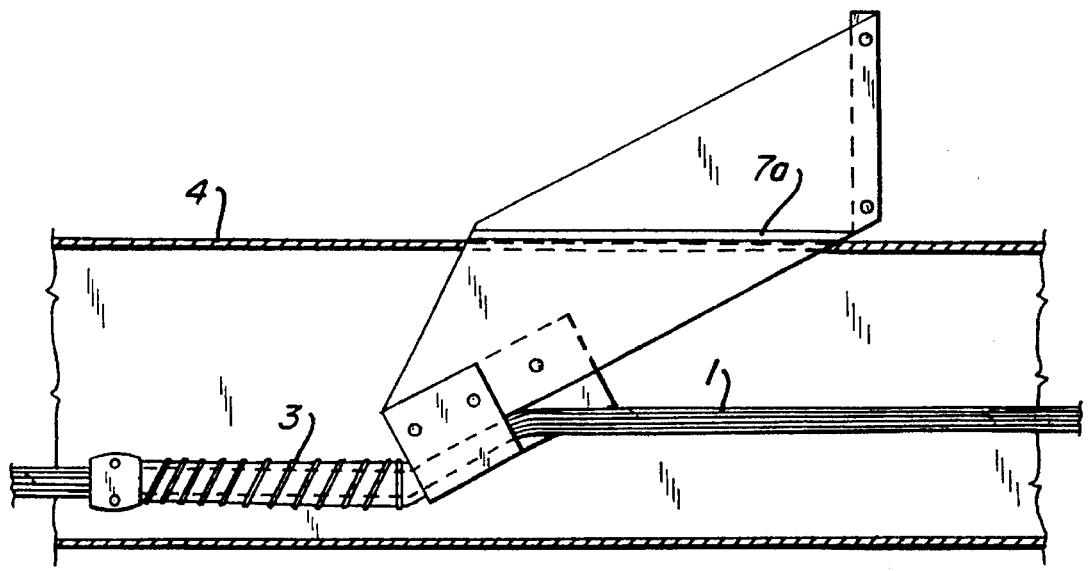
Fig_2C
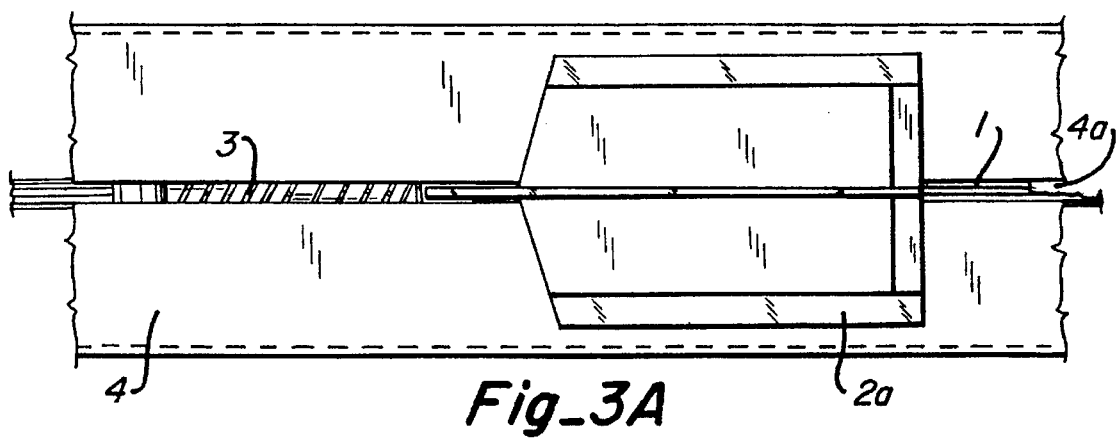
Fig_3A

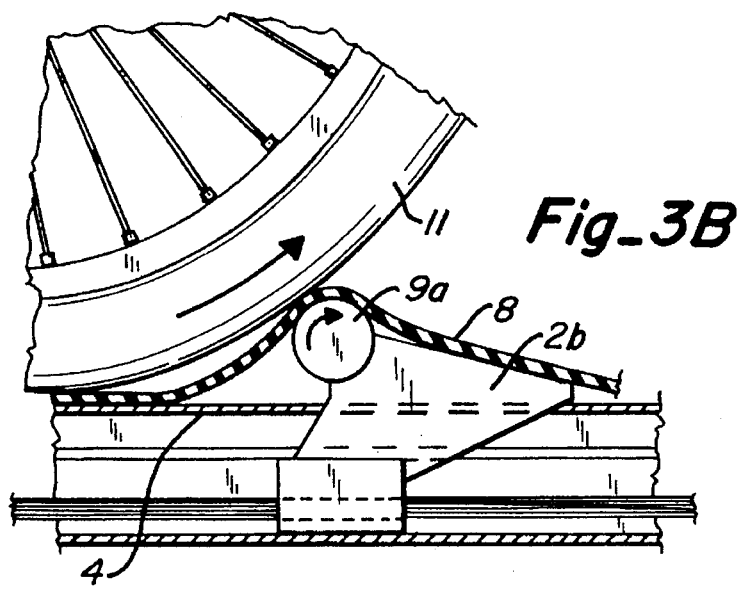
Fig_3B
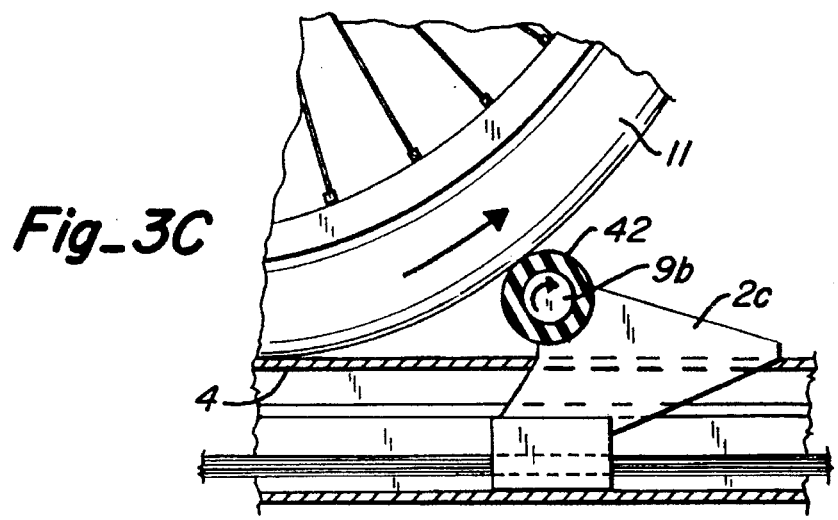
Fig_3C
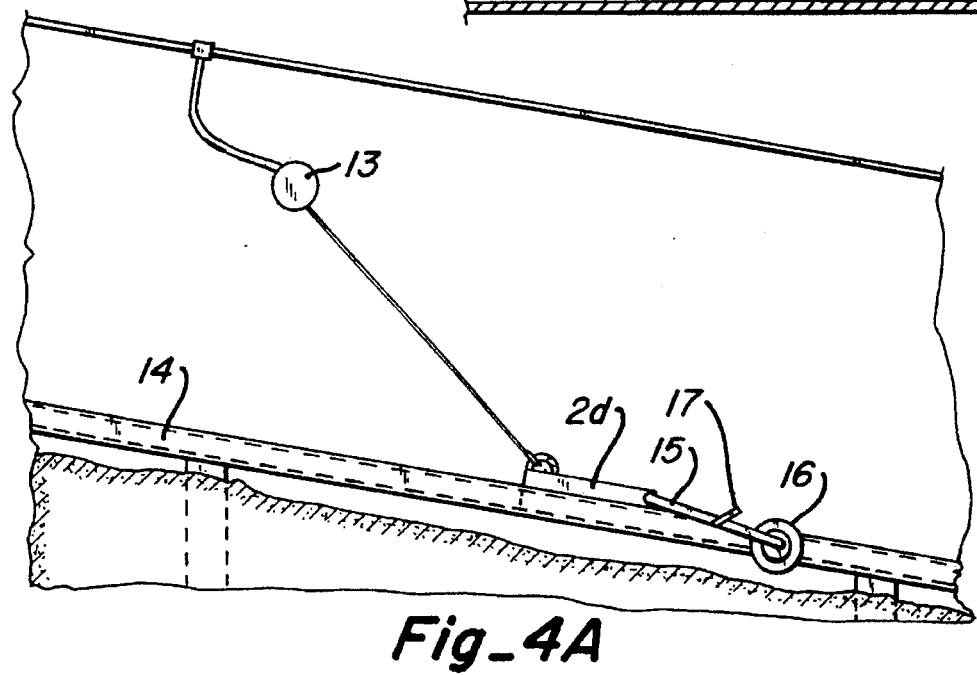
Fig_4A

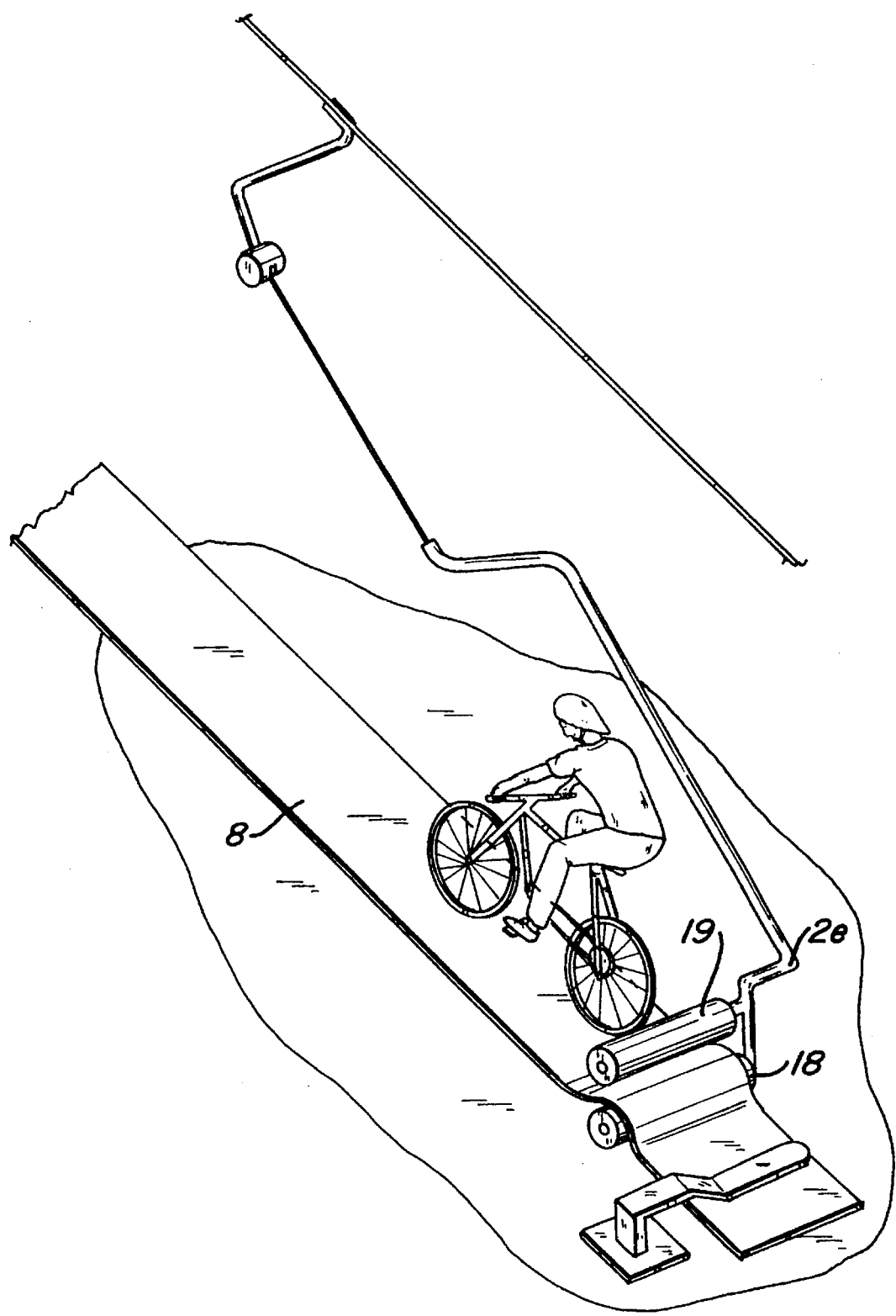
Fig_4B 5,566,621

CONVEYOR ARRANGEMENT FOR ROLLING TRANSPORT DEVICES

BACKGROUND OF THE INVENTION

The invention relates to an inclined elevator for man on cycle or on other rolling vehicles. The elevator is installed in inclined streets, pedestrian tracks or separate tracks specially designed for the purpose.

For health, environmental and economical reasons modern society as well as individuals wish to transfer the transport of people away from automobiles and to public transportation such as buses, trains or cycles, such as bicycles By different kinds of actions and/or technical means the use of cycles can be stimulated. The disadvantages and obstacles of cycling can be removed or deminished. In most modern cities, all over the world, a wide net of separate cycle tracks are being built in addition to a lot of other actions to improve the security and the general conditions of the cyclists.

Lately, the bicycle has gone through a technical development for example making it more suitable on rough ground or hilly terrain. This has led to increased popularity of cycling in towns and cities with a lot of hills. It is obvious however, that long and steep hills still represent a main hindrance for most of the cyclists. Saying this, we do not have in mind cyclists who are doing serious training. What really counts, transport wise is cycling to and from work, shopping, social visits etc., where the purpose for the cycling is transportation without to much physical effort.

Many towns and cities are characterized by terraced landscape where the major places of work and business are at the lower landscape level and where people live at the higher landscape level. Use of a cycle between work and home is therefore dependent upon traversing one or more steep hills between terraced landscape.

It is known that vertical elevators exist for the transport of people and goods where there is also room for a cycle. The cycle may also be transported on a rolling pavement. Ordinary elevators and rolling pavements are normally constructed for indoor use, and such installations for outdoor use present dominating and expensive encroachments on the landscape and the street environment.

It is also possible to adapt an ordinary gondola or cableway making it possible to transport cycles. These cableways are normally suspended on masts above the ground but may also be pulled at tracks on ground level, such as cable cans. These are normally installations that involve thorough and expensive encroachments in the terrain and street environment and often represent obstructions for vehicle traffic. Elevators and cableways are characterized by carrying the full weight of both cycle and cyclist.

U.S. Pat. No. 4,681,039 give a description of a hook device between a ski lift cable and a cycle having an automatic and manual release. This device is meant to pull a cyclist in the drag lifts trace in the summer season. The normal construction of a drag lift with wire suspended on masts at various heights above the ground, for practical and environmental reasons, will not be suitable for urban regions, for example in streets with heavy traffic.

SUMMARY OF THE INVENTION

The main object of this invention is to get a mechanical device that is resonable in price, secure and kind to the environment, giving the cyclist help to climb especially steep hills without a lot of physical effort and to use the cycles own wheels to roll on. This transport device should be installed in hills with little or no through traffic and a minimum of crossing traffic by other vehicles. The hill must be steep enough to represent a short cut and time saving route for the cyclist. The hill must also be positioned so that a great number of cyclists will benefit from the device. The cyclist shall sit on the cycle during the transfer and be pushed up and forward by the help of the device's carriers. In one version of the invention, all technical equipment is placed in the ground and the device pushes the cyclist uphill by pushing his foot which is resting on the device's carrier. The device is very simple to use and represents no security risk for the cyclist himself or other road-users. When the device is not in active use, the carriers run hidden and shielded inside the guide duct. The device can, with simple adjustments also be used by wheel chair users or other people sitting in, or standing on light wheel based transport devices.

BRIEF DESCRIPTION OF THE DRAWINGS

The following will describe the invention with reference to enclosed drawings, where FIG. 1 shows the illustration Of a cyclist on a transport device with carrier in accordance with the present invention.

FIG. 2 shows side draw of the performance in FIG. 1.

FIG. 3a shows side draw and top draw of the carrier in the performance in FIG. 1 and 2.

FIG. 3b shows another performance of the carrier 2b adapted to a stationary, flexible friction band (8) which is stretched on the whole guide duct.

FIG. 3c shows a third performance of the carrier (2c) with free running friction roll (9b) in contact with the cycle wheel.

FIG. 4a and 4b show variations of the invention adjusted to the technical construction of an ordinary ski lift with mast mounted pull wire.

DETAILED DESCRIPTION OF THE EMBODIMENTS

Firstly, we refer to FIG. 1. The transport device 10 is installed on or just above ground level. The device is based on an endless motor driven transport belt or other similar devices. The transport belt 1a can be wire, rope, chain or a belt of any known types. FIG. 2 shows an example of the use of steel wire (1) to make the belt 1a. Carriers 2a are fixed to the wire in definite intervals. Speed and the number of carriers 2a set the device's transport capacity.

Carriers (2a) on it's way uphill, but not in use, will stay inside the guide duct (4). Carriers (2a) that return downhill may be in one and the same guide duct 4 or in another guide duct without interfering with those going uphill. The guide duct (4) can be executed with different cross sections; quadrangle, cylindrical and in different materials; steel, aluminum, plastic. The example in FIG. 3ashows a rectangular duct with a lengthwise slit track (4a) for carrier guidance.

The carriers transporting the cyclists come partly out of and on top of the guide duct by help of an electrical or mechanical device controlled by the cyclist. After the cyclist has gotten off, the carrier disappears into the box containing the end wheel (6) on top of the hauling track. The carrier (2a) itself or a separate scraper fixed to the wire, seeks to clean the guide duct for waste and dirt falling into the slit track (4a).

The carrier 2a may be equipped with a wheel for controlling and reducing of friction in and/or on top of the guide duct. By use of special plastic materials giving low friction and great wear resistance, the wheels can be replaced with slide blocks or sliding surfaces (7a, 7b). To reduce the starting torque when a cyclist is being picked up by the transporting device, the carrier can be equipped with start attenuation devices (3) e.g. spring, torsion - or friction elements built into the carriers coupling to the wire.

In the preferred version of the invention, the cyclist shall stand with one foot on the carrier (2a) and the carrier pushes the cyclist up the hill. To ease the load on the cyclists leg muscles during start and on the way, the foot must be put well behind the vertical axis and the knee must be stretched.

In another version of the invention (FIG. 3b) a flexible friction belt (8), e.g. in rubber - or plastic material, is stretched over and directly on top of the guide duct and in the whole length of the guide duct. The carrier (2b), which will emerge from a signal, will in this version of the invention be equipped with a free running roller (9a), having the same width as the friction belt. The carrier guides the roller underneath the friction belt, and in this way creates an upwards moving wave (10) on the friction belt along the total length of the track. In this version of the invention the cycle's wheels (11) are being placed on top of the friction belt and the above mentioned wave starts moving the back wheel of the cycle on the track. The cycle and the cyclist will in this way be pushed upwards along the track. At the end of the track, the carrier ducks down into the guide duct as described earlier and returns to the start position.

In a third version of the invention (FIG. 3c) the carrier (2c) is equipped with a free running roller (9b) coated with a friction coating (12) pushing directly towards the cycles back wheel.

A variation of the invention is shown in FIG. 4a. It is adapted to an ordinary ski lift in such a way that cyclists can be pushed up the lift track in the summer season. The wire traction has a reel (13). The ski lift is equipped with a T-hook or disc clamp for pulling the skier. These pulling devices can totally or partly be replaced with a carrier (2d) for cyclists. The carrier can manually or automatically, be guided into or outside a guide (14) which is installed in contact with the ground. To follow the broken ground in a ski lift's track, the carrier can be equipped with a swivel arm (15) and for example a wheel (16) which touches the ground all the time. The cyclist can be pushed by placing the foot on e.g. a suitable carrier disc (17) or equivalent versions of the carrier 2b & 2c shown in FIG. 3b and 3c. The carrier can by simple adjustments or extensions and in combination with a roller track provided in the lift track be used by wheel chair users or others sitting or standing on a light wheel based transport device. The ski lift can because of this function can be used as a complete transport device by persons and goods in the summer season and in this way replace a chair lift or a cable car. FIG. 4b shows a variation of the invention where a flexible mat (8), stretched the length of the track functions as a roller track for the cycle and as forced guidance for the carrier (2e).

The mat can be made of e.g. textile, plastic or rubber, or other flexible material. The mat can also be constructed by the help of articulated elements, e.g. of wood or aluminum. The roller (18) is a variant of the roller (9a) in FIG. 3b, and the roller (19) is a variant of the roller (9b) in FIG. 3c.

I claim:

1. An engine-driven device for the transportation of a person on a cycle or wheeled transport tool, including an endless wire, or belt in a loop between two end points, having a level difference, and equipped with at least one foot carrier placed in contact with a forced guidance for the carrier, wherein the forced guidance is placed in contact with the ground, and the carrier is in guided encroachment with the forced guidance.

2. The transport device in accordance with claim 1, wherein the carrier includes a foot supporting device having a friction layer and a forward slope of approximately 30°–40°.

3. The transport device in accordance with claim 1, further comprising a start attenuating suspension and damping means.

4. An inclined elevator transport device for the transport of persons on a wheeled vehicle comprising:
   a) an endless conveyor means placed in a loop between two end points;
   b) a forced guidance means in ground contact;
   c) at least one foot carrier means in guided encroachment with the forced guidance; and
   d) a means for coupling the conveyor means to the carrier means.

5. The inclined elevator transport device as recited in claim 4 wherein the forced guidance means comprises a conveyor housing having a lower surface in ground contact and an upper divided track surface.

6. The inclined elevator transport device as recited in claim 5 wherein the carrier means comprises a plurality of carrier arrangements each having a guide arm extending through a divided track central area terminating forwardly below the track to thereat receive the conveyor coupling means and a receiving means having a support plate rigidly fastened to an upper portion of upper guide arm for driving contact against the person.

7. The inclined elevator transport device as recited in claim 5 wherein the coupling means comprises a start carrier damping means having a conveyor clamping means forward to the direction of travel and a trailing guide arm attachment bracket wherein the clamping means and the attachment bracket are flexibly connected by an expandable wire or band.

8. The inclined elevator transport device as recited in claim 6 wherein the support plate is inclined 30–40 degrees to the grade to be traveled.

* * * * *